Figure 2:
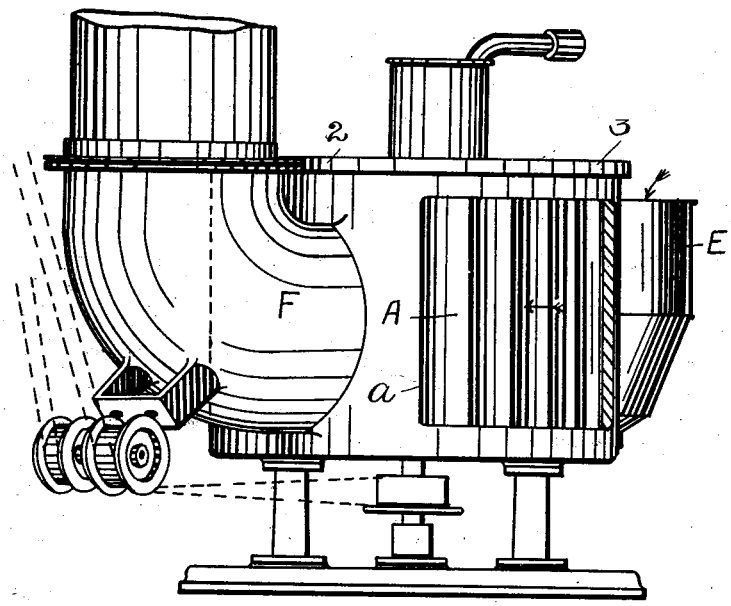
Figure 4:
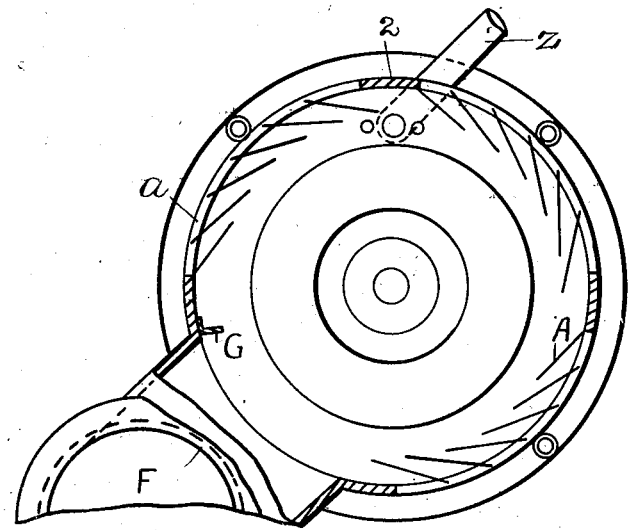

No. 628,092. Patented July 4, 1899.
C. G. HEPBURN.
APPARATUS FOR TREATING OILS OR FATS.
(Application filed Sept. 8, 1898.)
(No Model.) 8 Sheets—Sheet 1.
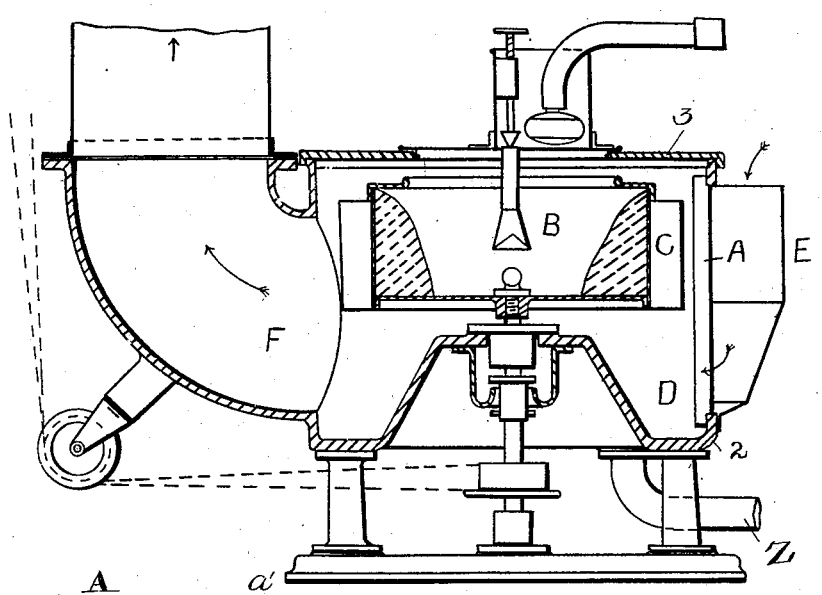
FIG. 1
FIG. 5
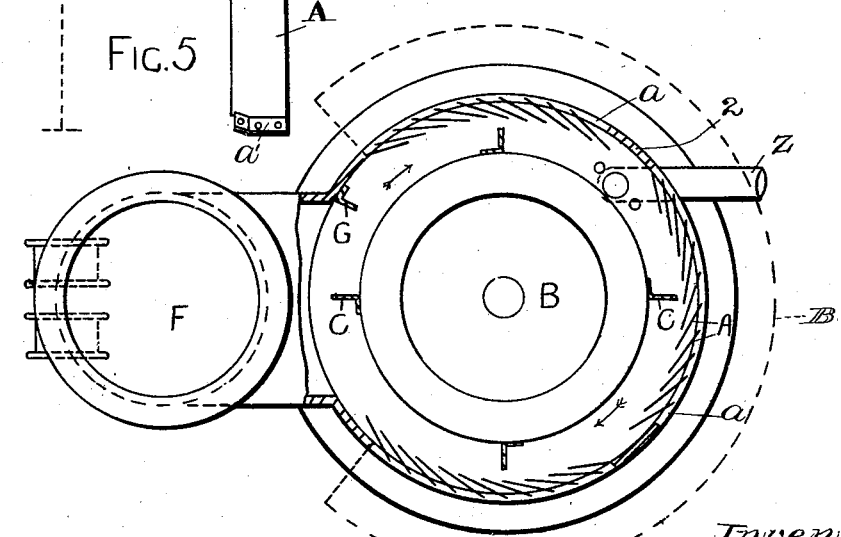
FIG. 3
Witnesses
Chas. E. Riordan
S. C. Edmonston
Inventor
Chas. G. Hepburn
By Julian D. Dowell
Atty No. 628,092. Patented July 4, 1899.
C. G. HEPBURN.
APPARATUS FOR TREATING OILS OR FATS.
(Application filed Sept. 8, 1898.)

(No Model.) 8 Sheets—Sheet 2.

No. 628,092. Patented July 4, 1899.
C. G. HEPBURN.
APPARATUS FOR TREATING OILS OR FATS.
(Application filed Sept. 8, 1898.)
(No Model.) 8 Sheets—Sheet 3.
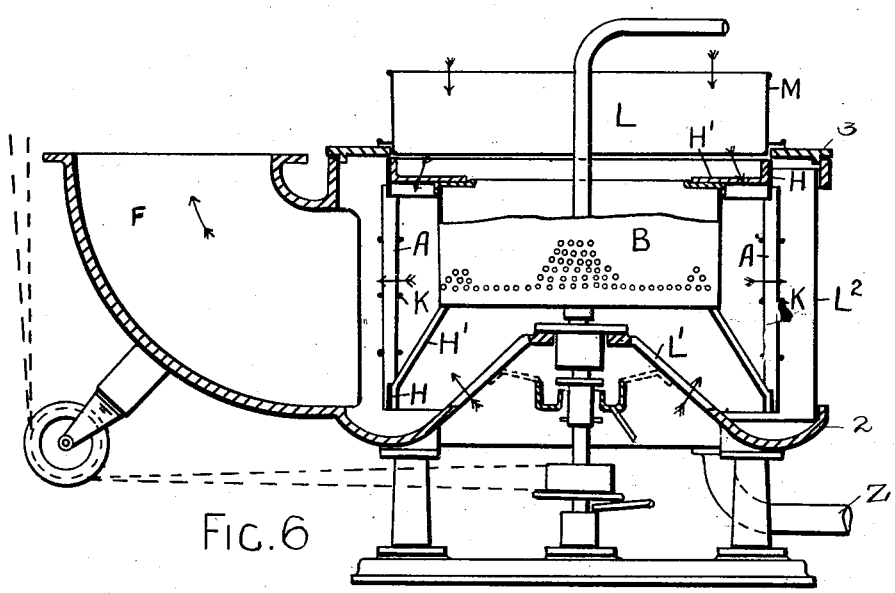
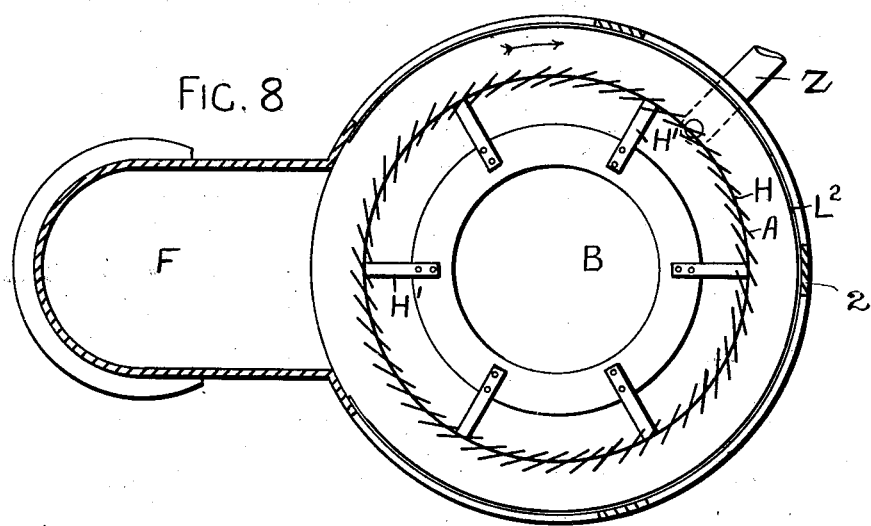

No. 628,092. Patented July 4, 1899.
C. G. HEPBURN.
APPARATUS FOR TREATING OILS OR FATS.
(Application filed Sept. 8, 1898.)

(No Model.) 8 Sheets—Sheet 4.

Witnesses
Chas. E. Rindon
S. O. Edmonston

Inventor
Chas. G. Hepburn
By Julius C. Dowell
Atty

No. 628,092. Patented July 4, 1899.
C. G. HEPBURN.
APPARATUS FOR TREATING OILS OR FATS.
(Application filed Sept. 8, 1898.)

(No Model.) 8 Sheets—Sheet 5.

Witnesses
Chas. E. Rinder
S. O. Edmonston

Inventor
Chas. G. Hepburn
By Julian C. Dowell
Atty

No. 628,092. Patented July 4, 1899.
C. G. HEPBURN.
APPARATUS FOR TREATING OILS OR FATS.
(Application filed Sept. 8, 1898.)
(No Model.) 8 Sheets—Sheet 6.
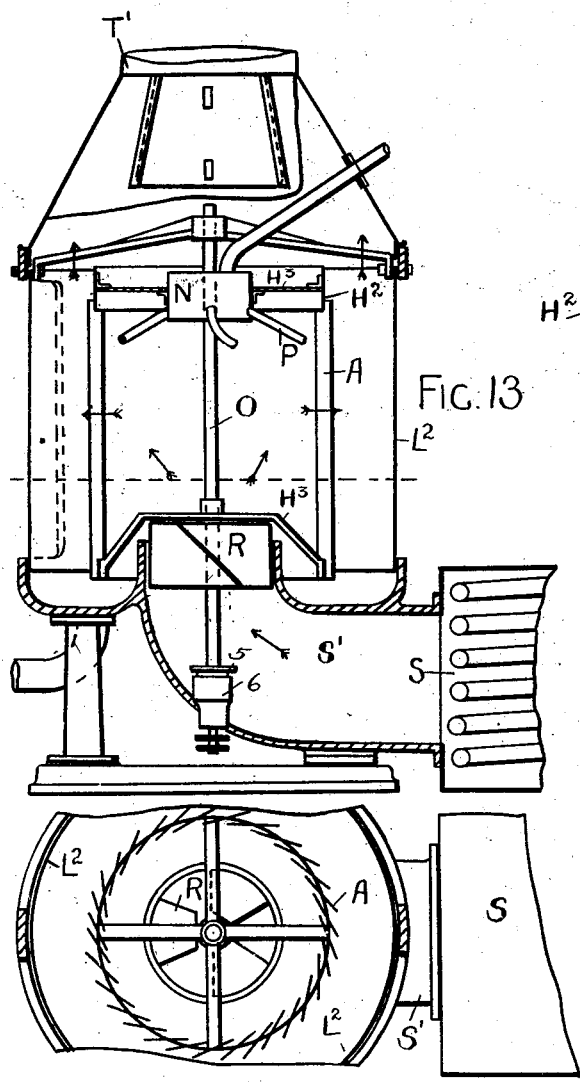
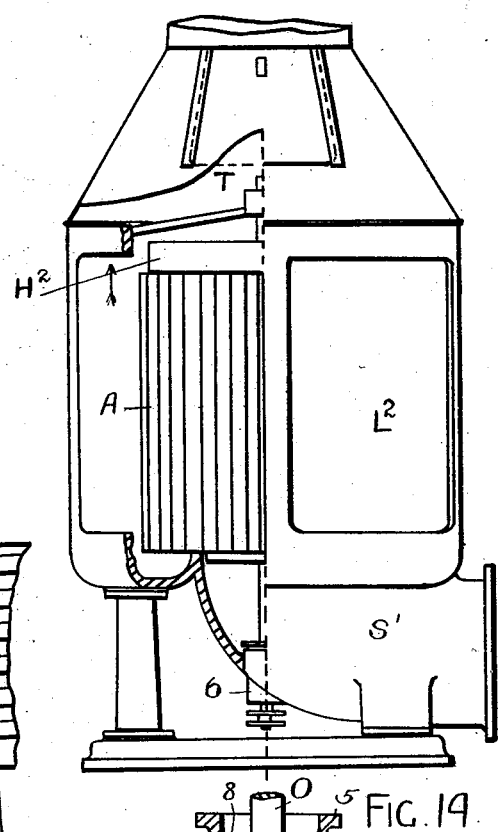
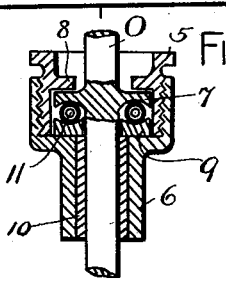
Witnesses
Chas. E. Riordan
S. C. Edmonton
Inventor
Chas. G. Hepburn
By Julian C. Dowell
Atty

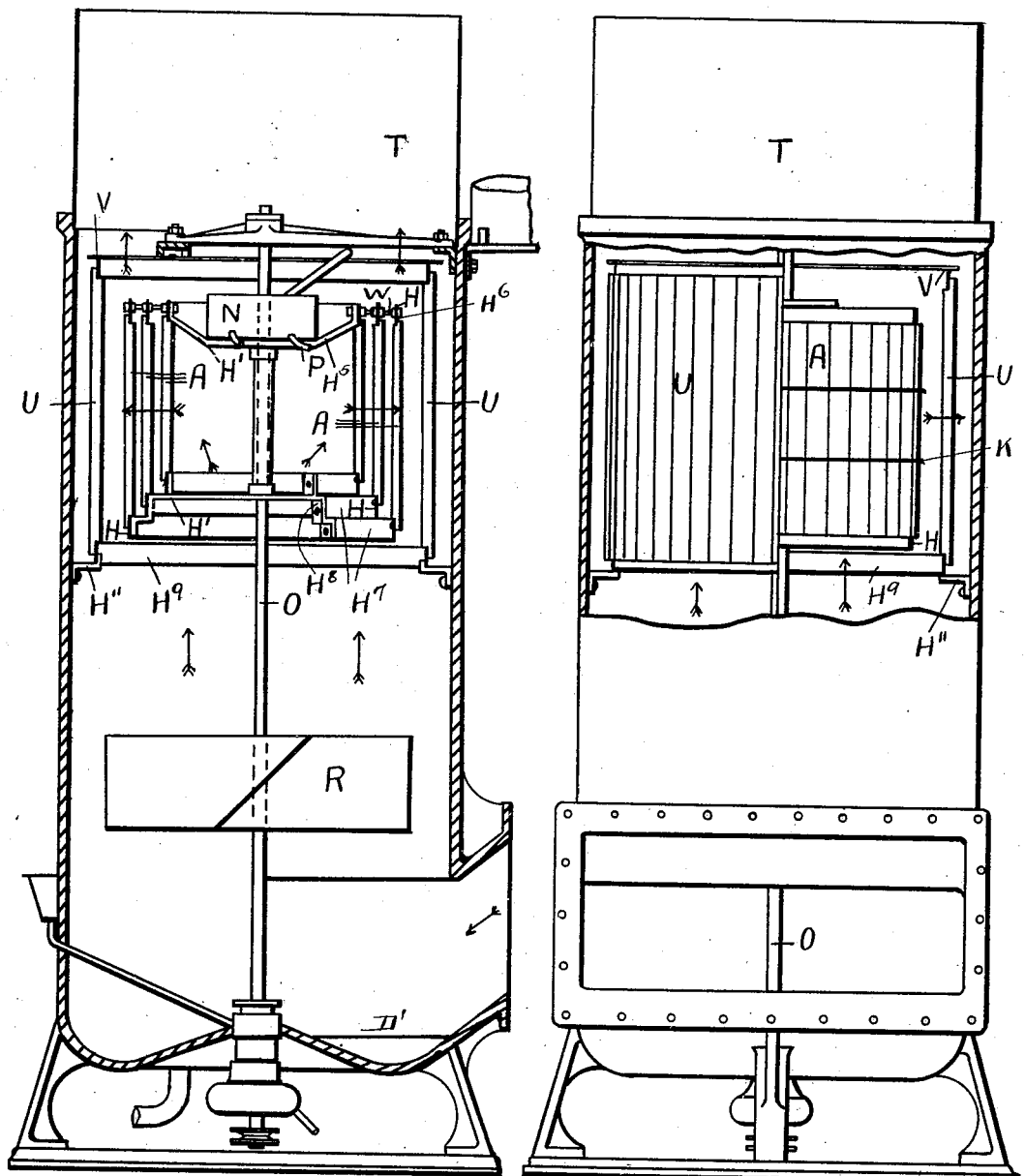

No. 628,092. Patented July 4, 1899.
C. G. HEPBURN.
APPARATUS FOR TREATING OILS OR FATS.
(Application filed Sept. 8, 1898.)

(No Model.) 8 Sheets—Sheet 8.

Witnesses
Chas. E. Riordon
S. C. Edmonston

Inventor
Chas. G. Hepburn
By Julian C. Dowell
Atty

THE NORRIS PETERS CO., PHOTO-LITHO., WASHINGTON, D. C.

UNITED STATES PATENT OFFICE.

CHARLES GRAHAM HEPBURN, OF NEUTRAL BAY, NEW SOUTH WALES.

APPARATUS FOR TREATING OILS OR FATS.

SPECIFICATION forming part of Letters Patent No. 628,092, dated July 4, 1899.

Application filed September 8, 1898. Serial No. 690,493. (No model.)

*To all whom it may concern:*

Be it known that I, CHARLES GRAHAM HEPBURN, engineer, a subject of the Queen of Great Britain and Ireland, residing at Neutral Bay, near Sydney, in the Colony of New South Wales, have invented new and useful Improvements in Apparatus for Treating and Cooling Heated Liquid Fats or Oils with Air, of which the following is a specification.

The objects of this invention are to provide apparatus of high efficiency and great capacity for atomizing liquid fats and oils and airblowing the same while so atomized.

The said apparatus consists of atomizing and air-propelling devices, in combination with a system of vertical louvers or overlapping spaced slats, which act as vehicles for constantly-changing films of oil or fat, which films are acted on by air-currents while flowing over the surfaces of said louvers.

I have devised several constructions of apparatus embodying my invention, all of which have louvers as the common essential feature. In some the louvers are stationary, and the spraying and air-propelling devices move relatively to them. In others the louvers move with the spraying and air-propelling devices.

In some cases filtering and air-attemperating apparatus are used in conjunction with the parts already enumerated; but in respect of this feature no claim is made.

In the construction shown in Figures 1 to 9 of the accompanying drawings the invention is applied to a centrifugal filter of the hydro-extractor type, Figs. 1 to 5 thereof being illustrative of a pattern in which the louvers are stationary and Figs. 6 to 9 of a pattern in which the louvers move with the basket. Figs. 10 to 22 are illustrative of types in which the louvers move, but in connection with which a filter is not used. The modified form of this type shown in Figs. 13 to 16 differs from that shown in Figs. 10 to 12 only in that an air-tight attemperating apparatus is shown in connection with it, while the further-modified type shown in Figs. 17 to 22 contains fixed louvers and also a compound system of moving louvers.

Figure 7:
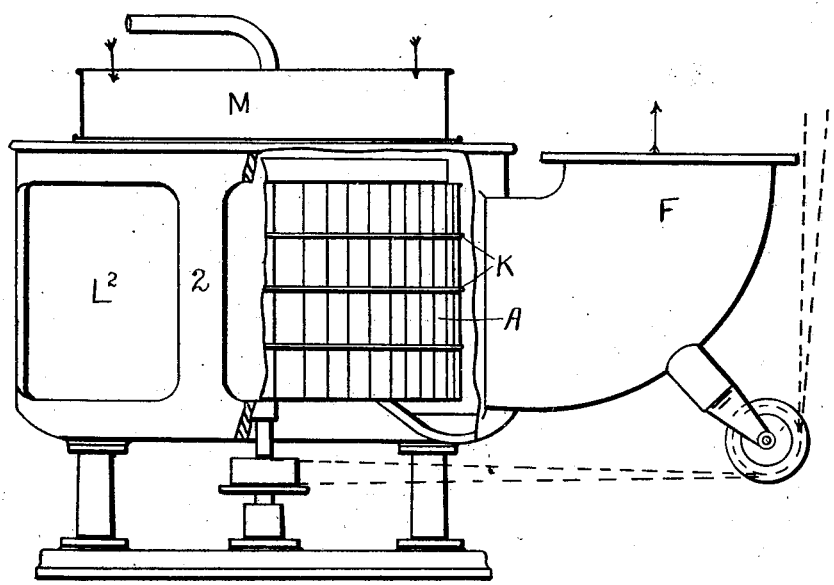
Figure 9:
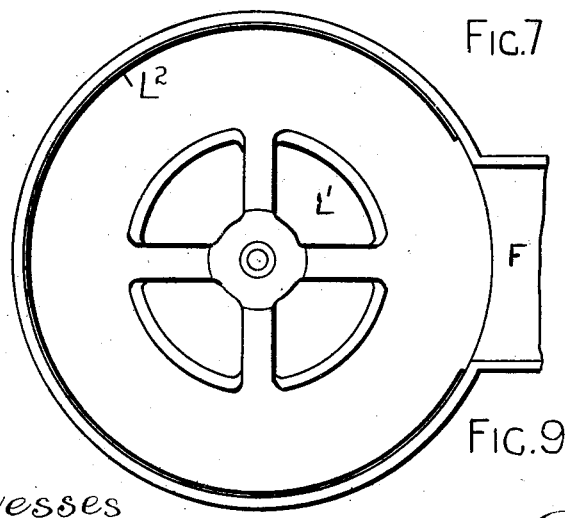
Figures 10, 11, 12:
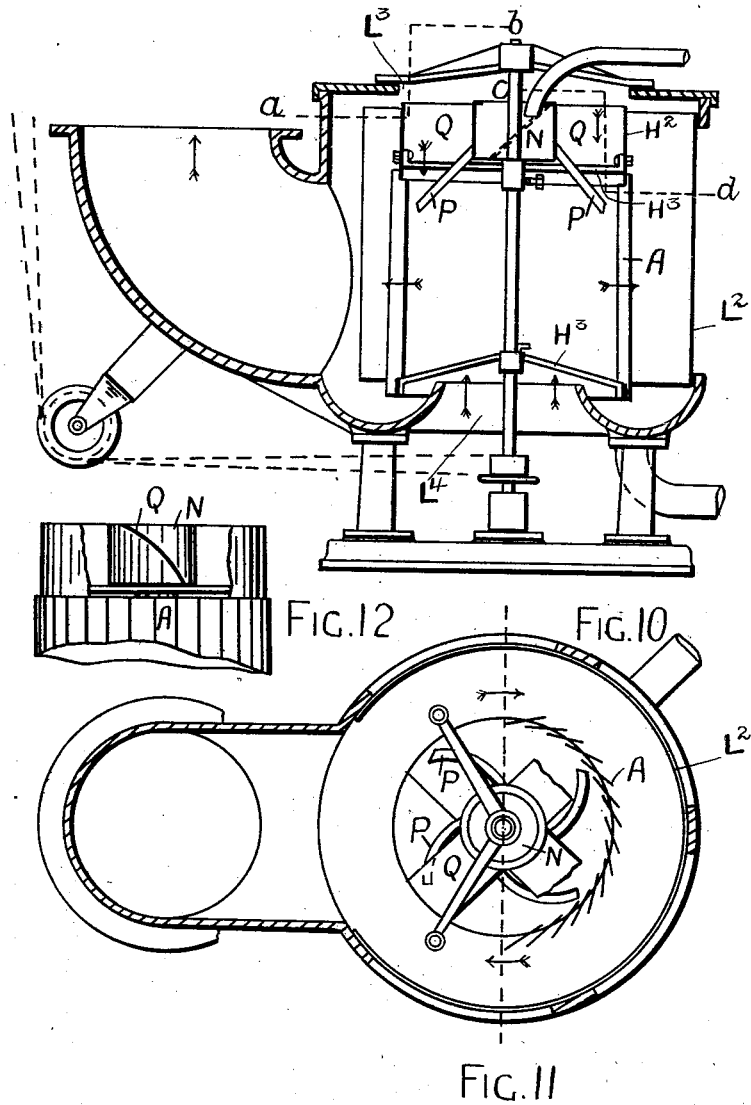
Figure 19:
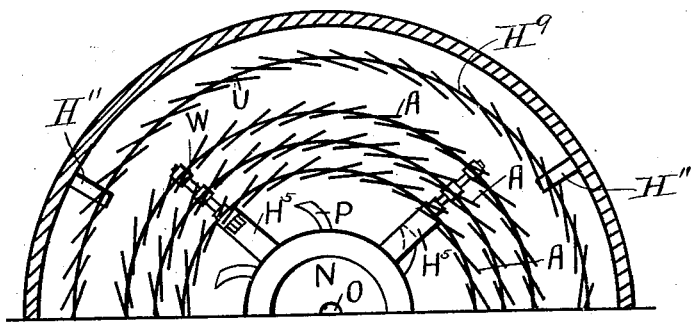
Figure 20:
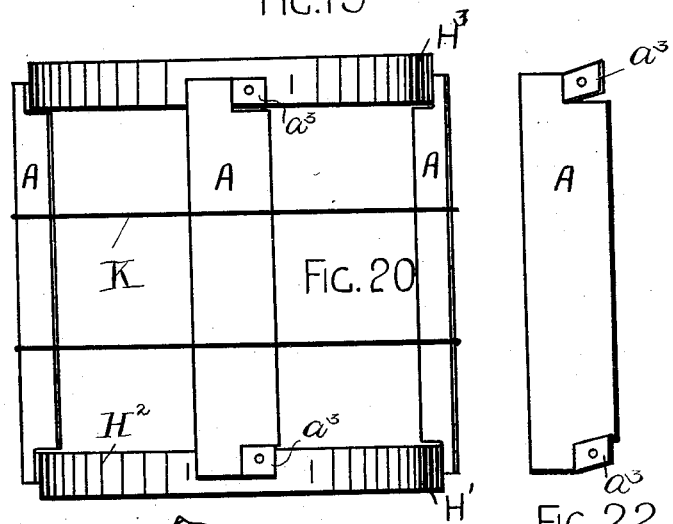
Figure 22:
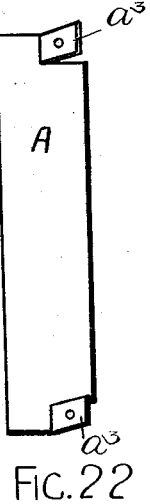
Figure 21:
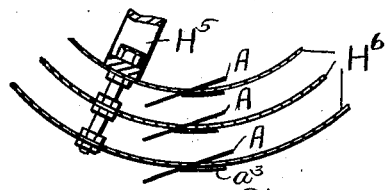

Fig. 1 is a vertical section through the first form of the apparatus. Fig. 2 is a side elevation of the same, and Figs. 3 and 4 horizontal sections illustrative of the arrangement of the louvers, the former showing them relatively narrow, but closely grouped, and the latter showing them wider and farther apart. Fig. 5 indicates the detail construction and pitching of the louvers; Fig. 6, a vertical section through the second form of the apparatus; Fig. 7, a side elevation, partly in section; Fig. 8, a horizontal section; Fig. 9, a horizontal section through the monitor only. Fig. 10 is a vertical section through the third form of the apparatus; Fig. 11, a horizontal section through same on lines $a\,b$ and $c\,d$, and Fig. 12 a detail view of the sprayer; Fig. 13, a vertical section; Fig. 14, a vertical sectional elevation; Fig. 15, a fragment horizontal section and plan, and Fig. 16 a detail of bottom bearing of spindle; Fig. 17, a vertical section through the compound louver construction; Fig. 18, a sectional elevation, and Fig. 19 a half horizontal section of same; Figs. 20 to 22, enlarged detail views illustrative of the mode of constructing the louvers.

Corresponding louvers are marked A in all the figures.

Referring to Figs. 1 to 5, the louvers are set in large apertures $a$ in the monitor or inclosing fixed casing Q in such direction that the air-swirl caused by the rotation of the filtering-basket B, which may be armed with vanes C, will induce an indraft of air. The spray of fat or oil thrown off by the basket is caught by the louvers and trickles in the form of a film over them into the well D of the monitor. E is a guard to prevent loss of material under treatment by catching spray which passes through the louvers, said guard extending in front of all the openings $a$, as indicated by broken lines in Fig. 3. The air-draft finds exit through the uptake F, at one edge of which a cut-off plate G is fitted. The louvers must be fixed approximately at the angles shown in order to produce high efficiency and prevent waste. They are preferably equipped with angular fastening-strips $a'$, as shown in Fig. 5, whose outstanding portions are bolted or riveted to the casing along the upper and lower sides of the openings $a$. The mounting and accessory fittings of the basket do not form any part of my invention, and hence need not be specifically described. The top of the monitor is closed from the atmosphere by a cover-plate 3 in order to restrict the air-draft to the louvered entrances and the uptake.

Referring to Figs. 6 to 9, the louvers A are in this arrangement fitted to the basket B and revolve with it. They are mounted on two rings H, secured to the basket by brackets H', and are reinforced by wire binding K. The top L and bottom L' of the monitor are open to allow air to inflow, and the sides L² of the monitor are made of thin sheet metal to obtain maximum radiation. M is a guard-plate fixed on top of the monitor to catch spray.

Referring to Figs. 10 to 12, this arrangement consists practically of that shown in Figs. 6 to 9, but without the basket-filter, for which a sprayer is substituted, and an air-propeller is also provided to increase the air-draft. The sprayer consists of a vessel N, mounted on the spindle O, and springing from it are four or more tubes P. About the vessel N a number of vanes Q are obliquely set, as shown, together forming the air-propeller, which induces a flow of air downward into the machine. The rotation of the louvers has a centrifugal effect, circulating the air within the monitor and continuously discharging it into the uptake. The louvers are fastened to rings or bands H², supported by brackets H³, radiating from the spindle O, to which they are secured. The top and bottom of the monitor are open, as shown at L³ and L⁴, and a sheet-metal piece L² closes the sides of the monitor.

Referring to Figs. 13 to 16, R is an air-propeller placed at the bottom of the monitor and arranged, when deemed necessary, to draw its air-supply from the drying or heating chamber S through a flue S'. The uptake T' is at the top. The arrangement of the sprayer and louvers is as described with reference to Figs. 10 to 12. The spindle O has a bearing in the lower side of the flue S' and shown in section in Fig. 16, the same comprising interlocked sleeves 5 and 6, having male and female screw-threads, a dished flange or raceway 7 on the spindle and extending under a flange 8 on the sleeve 5, a cupped disk or raceway 9 in the sleeve 6, with a tubular stem 10 fitting around the spindle, and antifriction-balls 11.

Referring to Figs. 17 to 22, the moving louvers A are triplicated in concentric sets, and there is an additional ring of fixed louvers U surrounding them. The form of the monitor is altered. It is made deeper in the lower part than the monitor which is shown in Figs. 13 and 14, and the air-propeller R, which is of increased size, is set midway between the louvers and the monitor-well D'. W are studs fitted radially to brackets H⁵ on the distributer N and adapted to support the rings H⁶, on which the upper ends of the revolving louvers are fixed, their lower ends being similarly fixed to stepped rings H⁷, supported by correspondingly-formed brackets H⁸, fastened to the spindle O. V is a baffle-ring to prevent upward spraying by the revolving louvers and also serving as a support for the upper ends of the fixed louvers U, the lower ends of which are fastened to a ring H⁹, supported on brackets H'' on the sides of the casing.

The securing of the louvers to the rings may be conveniently effected in the manner shown in Figs. 20 and 22, where said louvers are represented as formed at the upper and lower ends with bent-out lips $a^3$ for riveting to the rings H², so as to secure the louvers at the desired angle. A similar mode of securing the louvers is indicated in Fig. 21.

In all the constructions described in which the louvers are made to revolve they are set pointing outward in the direction of their motion. If they were set like the blades of a fan, with faces thrown backward, they would fail to act satisfactorily, as they would discharge the fat and oil too readily. When set as described, the spray of fat or oil spreads itself gradually over the whole surface and remains thereon sufficiently long to be thoroughly acted on by the air-current.

The machine having been set in motion and the supply of fluid fat or oil connected, the methods of operation of the several designs are as follows:

Referring to Figs. 1 to 5, the basket throws off a fine spray of the fluid, which is caught by the louvers A, forming a film thereon and flowing slowly over their surfaces into the well. Meantime a current of air induced by the circulation of air which is produced by the rotation of the basket within the monitor enters the spaces between the louvers, acts on the film of oil or fat flowing over the same, and finally passes away through the uptake F.

Referring to Figs. 6 to 9, the spray of fluid thrown off by the basket B is caught by the louvers A, and while passing over the surfaces of the same is acted upon by the current of air, which enters above and below the basket and finds exit at the uptake-mouth at the side of the monitor.

Referring to Figs. 10 to 12, the revolution of the louvers produces a centrifugal effect and induces an air-draft into the monitor at the top and bottom openings and out of it through the uptake-opening at the side. The air-draft is caused by the action of the down-draft air-propeller Q. The sprayer covers the louvers with a film of oil or fat, which is acted on by the air-drafts while it is passing over them. The used air passes away through the uptake at the side of the monitor.

Referring to Figs. 13 to 16, an air-draft into the monitor through the lower inlet is produced by the updraft air-propeller R and the centrifugal action of the revolving louvers. The used air escapes in a spiral column through the central uptake T'. The spray of fat or oil thrown off by the sprayer N P forms a film on the louvers which is acted on by the current of air passing out between them.

Referring to Figs. 17 to 22, an updraft is created by the air-propeller R. The spray of fat or oil thrown off by the distributer N and its pipes P is caught by the moving louvers A, on each of which in turn it becomes distributed. It finally becomes sprayed onto the fixed louvers U and spreads itself over them in a film and flows along them, leaving their lower edges in the form of a fine shower and dripping into the well D'. The column of air from the propeller ascends spirally, and being caught by the revolving louvers centrifugal motion is imparted to it, and it passes out between the louvers, acting on the films of fat or oil thereon, and ultimately finds egress at the top of the monitor.

The treated fat or oil is in all cases deposited in the annular well formed in the bottom of the monitor, whence it is drawn off through a pipe Z.

What I claim as my invention, and desire to secure by Letters Patent, is—

1. In apparatus for air-blowing oils and liquid fats, the combination of an oil-sprayer, a series of vertically-arranged overlapping slats or louvers surrounding said sprayer to catch said spray, and means for causing an air-draft through said louvers, substantially as described.

2. In apparatus for air-blowing oils and liquid fats, the combination of a rotating filter adapted to eject the filtrate in a spray, and to act as an air-whirler, a series of vertically-arranged overlapping slats or louvers surrounding said rotating filter through which air is sucked inward, an uptake through which the spent air is ejected, and a well into which the treated filtrate passes, substantially as described.

3. In apparatus for air-blowing oils and liquid fats, the combination of a rotating sprayer and a series of vertically-arranged overlapping slats or louvers completely surrounding said sprayer and moving therewith within a casing having air-inlet openings at the center and an air-outlet at the side, and a well to receive the treated oil or fat, substantially as described.

4. In apparatus for air-blowing oils and liquid fats, the combination of a rotating sprayer, two or more concentric rings or series of vertically-arranged overlapping slats or louvers completely surrounding said sprayer and rotating therewith, a fixed ring of louvers surrounding said movable louvers, a monitor or casing with well to receive the treated material, and an air-propeller below the louvers, substantially as described.

5. In an apparatus of the character described, the combination of a circular series of vertically-arranged overlapping slats spaced apart, means for spraying matter in a liquid state outwardly against said slats, an inclosing casing, and means for creating air-currents through the spaces between the slats.

6. In an apparatus of the character described, the combination of a rotary sprayer, a circular series of vertically-arranged and obliquely-set overlapping slats around the sprayer, an inclosing casing, and means for creating air-currents in the spaces between the slats.

7. In an apparatus of the character described, the combination of a rotary spraying device, a circular series of vertically-arranged overlapping slats spaced apart, around the sprayer and rotating therewith, a fixed series of overlapping slats surrounding the rotary series, an inclosing casing and means for creating air-currents in the spaces between the slats.

In witness whereof I have hereunto set my hand in presence of two witnesses.

CHARLES GRAHAM HEPBURN.

Witnesses:
W. I. SPENCER,
W. I. DAVIS.